(12) United States Patent
Dong et al.

(10) Patent No.: US 9,348,848 B2
(45) Date of Patent: May 24, 2016

(54) METHODS AND APPARATUS FOR IDENTIFYING TABLES IN DIGITAL FILES

(71) Applicants: PEKING UNIVERSITY FOUNDER GROUP CO., LTD., Beijing (CN); BEIJING FOUNDER APABI TECHNOLOGY LTD., Beijing (CN)

(72) Inventors: Ning Dong, Beijing (CN); Wenjuan Huang, Beijing (CN)

(73) Assignees: Peking University Founder Group Co., Ltd., Beijing (CN); Beijing Founder Apabi Technology Ltd., Beijing (CN)

( * ) Notice: Subject to any disclaimer, the term of this patent is extended or adjusted under 35 U.S.C. 154(b) by 217 days.

(21) Appl. No.: 13/871,862

(22) Filed: Apr. 26, 2013

(65) Prior Publication Data
US 2013/0290376 A1    Oct. 31, 2013

(30) Foreign Application Priority Data

Apr. 27, 2012 (CN) .......................... 2012 1 0129059

(51) Int. Cl.
G06F 17/30    (2006.01)
G06F 17/24    (2006.01)
G06K 9/00     (2006.01)

(52) U.S. Cl.
CPC ........ *G06F 17/30289* (2013.01); *G06F 17/245* (2013.01); *G06K 9/00463* (2013.01)

(58) Field of Classification Search
CPC .......................... G06F 17/30256; G06F 17/245
USPC ................... 707/706, 999.004, 737, 999.006, 707/E17.039, E17.12, E17.089, E17.108, 707/602, 758, 780, 999.003, 999.005, 707/999.1, E17.005, E17.013, E17.014, 707/E17.02, E17.091, E17.099, 687, 692, 707/693, 711, 713, 722, 738, 739, 741, 767, 707/769, 776, 777, 778, 812, 999.001, 707/999.002; 709/238, 223, 225, 229, 239, 709/201, 202, 203, 218, 219, 224, 226, 227, 709/232, 241

See application file for complete search history.

(56) References Cited

U.S. PATENT DOCUMENTS 5,668,892 A * 9/1997 Itonori ......................... 382/177
5,950,196 A * 9/1999 Pyreddy et al. ............... 715/227
6,006,240 A * 12/1999 Handley ........................ 715/220

FOREIGN PATENT DOCUMENTS

CN    101676930 A * 3/2010    ............... G06K 9/20

OTHER PUBLICATIONS

Jing et al. "A table Detection Method for multipage PDF documents via Visual Separators and Tabular Structure", 2011 International Conference on Document Analysis and Recognition, Sep. 18-21, 2011.*

*Primary Examiner* — Jay Morrison
*Assistant Examiner* — Ken Hoang
(74) *Attorney, Agent, or Firm* — Finnegan, Henderson, Farabow, Garrett & Dunner, LLP

(57) ABSTRACT

A method for identifying a table in a digital file includes extracting lines from a layout of the digital file, wherein the lines comprise horizontal lines and vertical lines. The method also includes identifying intersected line groups, wherein each intersected line group comprises a horizontal line of the extracted horizontal lines and a vertical line of the extracted vertical lines, the horizontal line and the vertical line intersecting with each other. The method further includes determining whether the number of intersected lines in each intersected line group is larger than a first threshold. If yes, the method further includes identifying an area in which the intersected line groups are located as a table area. If no, the method further includes performing vertical projection on characters in the area, and identifying the area as a table area based on results of the vertical projection.

10 Claims, 3 Drawing Sheets

METHODS AND APPARATUS FOR IDENTIFYING TABLES IN DIGITAL FILES

CROSS REFERENCE OF RELATED APPLICATIONS

This application claims the benefit of Chinese Patent Application No. 201210129059.1, filed on Apr. 27, 2012, which is incorporated by reference in its entirety as part of this application.

TECHNICAL FIELD

The present application relates to digital file processing technique.

BACKGROUND

Nowadays, in the industries of, for example, newspaper or publication, there is often a need to extract an article and related metadata information from a layout of a digital file for further use, for example, to reconstruct or index article information. In order to restore contents of the layout accurately, besides the content information on the file, such as title, cited title, sub-theme, author, text, or other information, there is also a need to extract a position, font, size and other information of a required text block for the file.

Recently, when a digital newspaper is indexed, for example, when the contents information of the newspaper (such as date of publishing, edition and version name) is organized, there may be a large number of tables in the layout to be processed. Generally, these tabular data cannot be processed automatically and a manual processing is very complex. Therefore, a general processing approach is proposed to discard these data or to store these data as pictures. However, this approach will result in losing of the tabular data.

SUMMARY

In accordance with the present disclosure, there is provided a method for identifying a table in a digital file. The method includes extracting lines from a layout of the digital file, wherein the lines comprise horizontal lines and vertical lines. The method also includes identifying intersected line groups, wherein each intersected line group comprises a horizontal line of the extracted horizontal lines and a vertical line of the extracted vertical lines, the horizontal line and the vertical line intersecting with each other. The method further includes determining whether the number of intersected lines in an intersected line group is larger than a threshold. If yes, the method further includes identifying an area in which the intersected line groups are located as table area. If no, the method further includes performing vertical projection on characters in the area, and identifying the area as a table based on results of the vertical projection.

Also in accordance with the present disclosure, there is provided an apparatus for identifying a table in a digital file. The apparatus includes a line extracting component configured to extract lines from a layout of the digital file, a projecting component configured to perform vertical projection on characters, and a table identifying component configured to identify intersected line groups, wherein each intersected line group comprises a horizontal line of the extracted horizontal lines and a vertical line of the extracted vertical lines, the horizontal line and the vertical line intersecting with each other. The table identifying component is further configured to determine whether the number of intersected lines in an intersected line group is larger than a first threshold, and if yes, identify an area in which the determined intersected line groups are located as a table area, if no, identify the area as a table area based on results of a vertical projection performed on characters in the area.

Also in accordance with the present disclosure, there is provided a method for identifying a table in a digital file. The method includes extracting lines from a layout of the digital file, wherein the lines include horizontal lines and vertical lines. The method also includes identifying intersected lines, wherein each intersected line intersecting with another line. The method further includes performing vertical projection on characters in an area in which the intersected lines are located, detecting projected characters that are located between horizontal lines and vertical lines of the intersected lines; and determining whether the number of the characters located between horizontal lines and vertical lines of the intersected lines is smaller than a preset threshold. The method further includes, if the number is smaller than the preset threshold, identifying the area as a table area.

Features and advantages consistent with the disclosure will be set forth in part in the description which follows, and in part will be obvious from the description, or may be learned by practice of the disclosure. Such features and advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWING

Exemplary non-limiting embodiments of the present disclosure are described below with reference to the attached drawings. The drawings are illustrative and generally not to an exact scale. The same or similar elements on different figures are referenced with the same reference numbers

DETAILED DESCRIPTION

Figure 1:
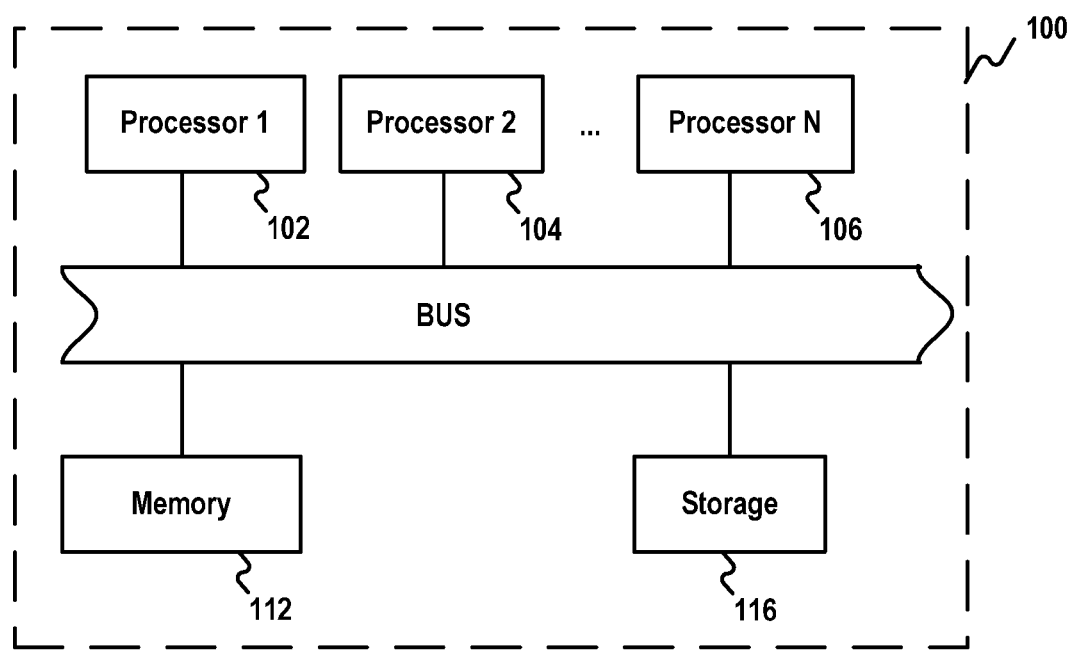
FIG. 1 is a schematic diagram illustrating an apparatus for identifying a table in a digital file, according to an exemplary embodiment.

Reference will now be made in detail to exemplary embodiments, examples of which are illustrated in the accompanying drawings. When appropriate, the same reference numbers are used throughout the drawings to refer to the same or like parts. FIG. 1 is a schematic diagram illustrating an exemplary apparatus 100 for identifying a table in a digital file, consistent with embodiments of the present disclosure.

Apparatus 100 may include a general purpose computer, a computer cluster, a mainstream computer, a computing device dedicated for providing online contents, or a computer network comprising a group of computers operating in a centralized or distributed fashion. As shown in FIG. 1, apparatus 100 includes one or more processors (processors 102, 104, 106, etc.), a memory 112, a storage device 116, a communication interface 114, and a bus to facilitate information exchange among various components of apparatus 100. Processors 102-106 may include a central processing unit ("CPU"), a graphic processing unit ("GPU"), or other suitable information processing devices. Depending on the type of hardware being used, processors 102-106 may include one or more printed circuit boards, and/or one or more microprocessor chips. Processors 102-106 may execute computer program instructions to perform methods consistent with embodiments of the present disclosure, which will be explained in greater detail below.

Memory 112 may include, among other things, a random access memory ("RAM") or a read-only memory ("ROM"). Computer program instructions may be stored in and read from memory 112 for execution by one or more of processors 102-106. For example, memory 112 may store one or more software applications. Further, memory 112 may store an entire software application or only a part of a software application that is executable by one or more of processors 102-106. It is noted that although only one block is shown in FIG. 1, memory 112 may include multiple physical devices installed on a central computing device or on different computing devices.

In some embodiments, storage device 116 may be configured to store a large amount of data, such as databases containing data of a layout information of a file, etc. Storage device 116 may also store software applications that are executable by one or more of processors 102-106. Storage device 116 may include one or more magnetic storage media such as hard drive disks; one or more optical storage media such as compact disks (CDs), CD-Rs, CD±RWs, DVDs, DVD±Rs, DVD±RWs, HD-DVDs, Blu-ray discs; one or more semiconductor storage media such as flash drives, SD cards, memory sticks; or any other suitable computer readable media.

Figure 2:
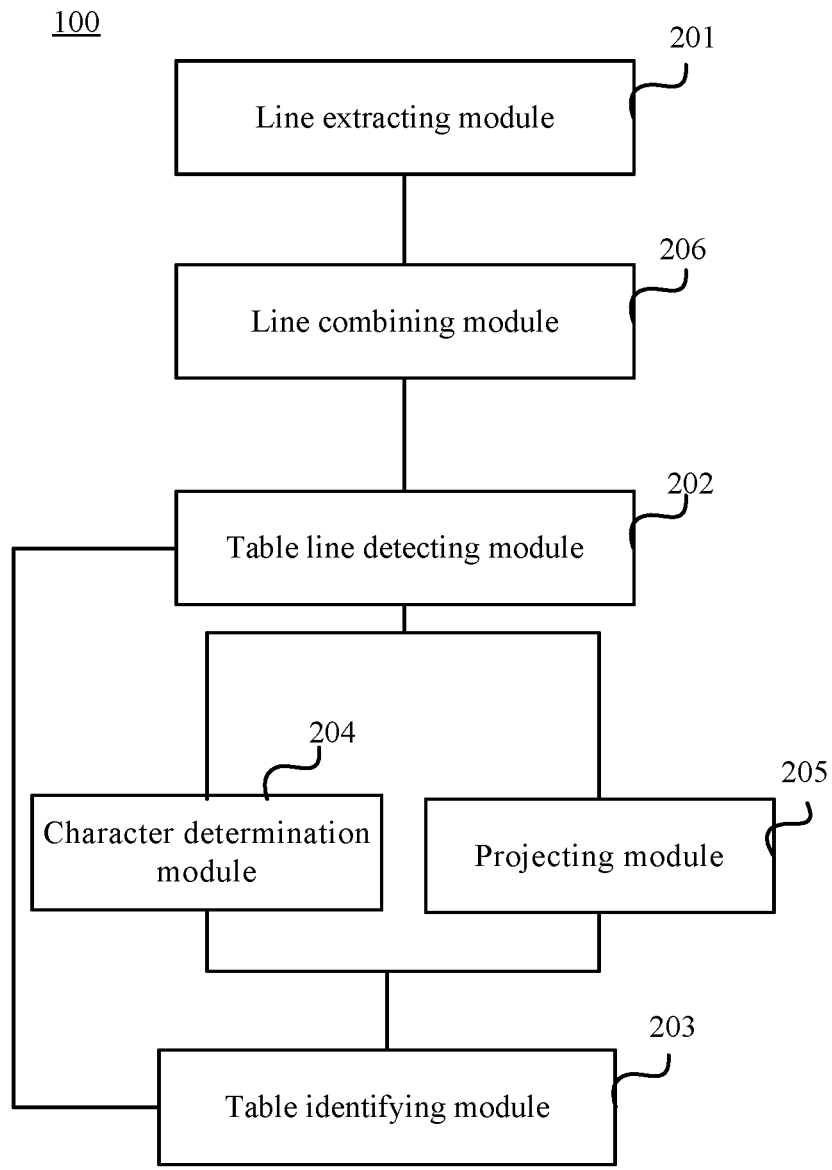
FIG. 2 is a schematic diagram illustrating an apparatus for identifying a table in a digital file, according to an exemplary embodiment.

Embodiments consistent with the present disclosure include methods, systems, and apparatuses for identifying a table in a digital layout file. FIG. 2 is a block diagram showing modules of the apparatus 100, consistent with embodiments of the present disclosure.

As shown in FIG. 2, apparatus 100 includes a line extracting module 201, a table line detecting module 202, and a table identifying module 203. The line extracting module 201 is configured to extract lines in a layout of a digital file and group the extracted lines into a group of horizontal lines (hereinafter referred to as horizontal line class) and a group of vertical lines (hereinafter referred to as vertical line class). The table line detecting module 202 is configured to detect whether a horizontal line in the horizontal line class intersects with a vertical line in the vertical line class. The two lines that intersect with each other are grouped as an intersected line group. The table identifying module 203 is configured to detect whether the number of intersected lines in an intersected line group is larger than a first threshold. If yes, the table identifying module 203 determines an area (a first area), in which the intersected line groups are located, to be a table area. Otherwise, texts in the first area are vertically projected, and results of the vertical projection are used to determine whether the first area is a table area.

Referring to FIG. 2 again, in some embodiments, the apparatus 100 further includes a character determination module 204 configured to determine individually whether there are one or more characters located between horizontal lines in the intersected line groups. If yes, the character determination module 204 further detects whether the one or more characters between the horizontal lines are located between vertical lines and whether the number of characters is smaller than a second threshold. If the one or more characters are located between vertical lines and the number of characters is smaller than the second threshold, the character determination module 204 identifies the first area, in which the intersected line groups are located, as a table area.

Referring to FIG. 2 again, in some embodiments, the apparatus 100 further includes a projecting module 205 configured to extract characters in an area where each line of table classes (which will be described in more detail later) is located and to obtain a distance between any two characters. The projecting module 205 further determines whether two characters are neighboring characters based on the distance between them. If yes, the projecting module 205 combines the neighboring characters to form a character block and then performs vertical projection on the combined character block to determine an interval range of each character block in a column direction, and to determine the number of rows in each column based on the determined interval range. If the number of projected columns is larger than or equal to 2, the projecting module 205 determines the area in which the lines in the table class are located as a table area.

In some embodiments, as shown in FIG. 2, the apparatus 100 further includes a line combining module 206 configured to determine, for any two horizontal lines whose endpoints have the same Y coordinates, whether the two horizontal lines include at least one point having the same coordinates. If yes, the line combining module 206 combines the two horizontal lines into one horizontal line. In addition, the line combining module 206 is further configured to determine, for any two vertical lines whose endpoints have the same X coordinates, whether the two vertical lines include at least one point having the same coordinates. If yes, the line combining module 206 combines the two vertical lines into one vertical line.

Figure 3:
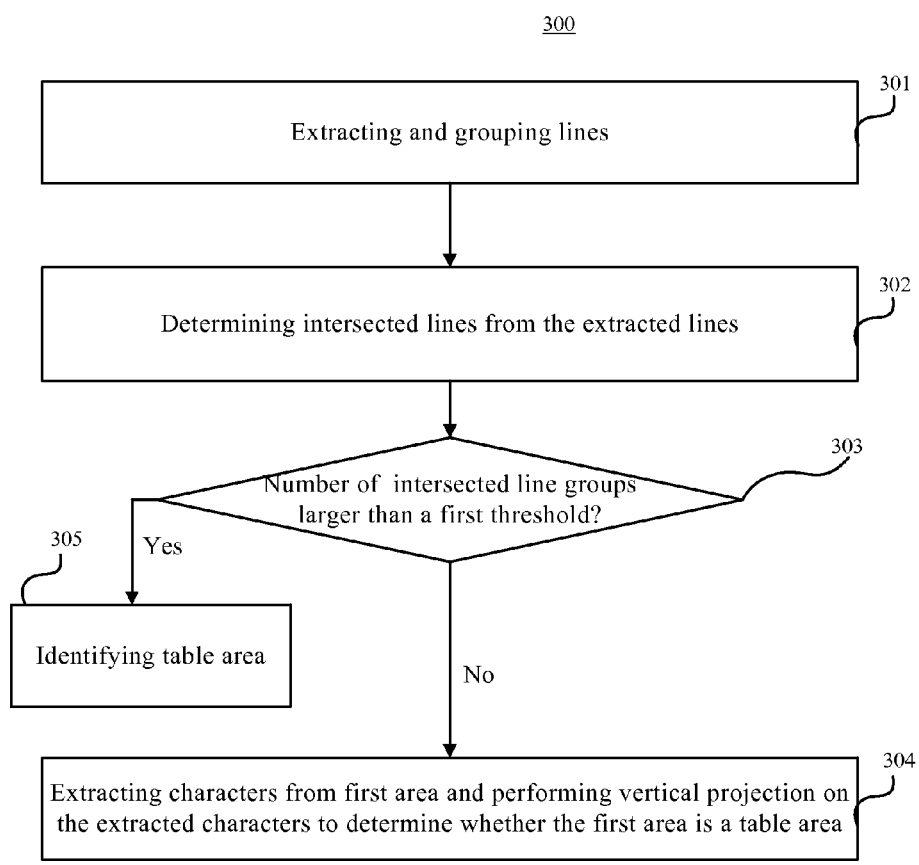
FIG. 3 is a flowchart illustrating a method for identifying a table in a digital file, according to an exemplary embodiment.

FIG. 3 is a flowchart showing a process 300 for identifying a table in a digital layout file, consistent with embodiments of the present disclosure. Process 300 shown in FIG. 3 comprises a plurality of steps that may be performed by one or more of processors 102-106 of apparatus 100 to implement a data processing operation initiated by a user.

At 301, lines in a layout of the digital file are extracted and grouped into a group of horizontal lines (i.e., horizontal line class) and a group of vertical lines (i.e., vertical line class). In particular, graphical information in the layout is extracted and it is determined whether there are any horizontal or vertical solid lines in the digital file. If so, the lines are stored in, for example, a table line array m_arrGraphBlock. The detailed description of grouping is discussed below.

1) Grouping of Horizontal Lines

Check whether Y coordinates of two endpoints of a line LineH in m_arrGraphBlock are the same. If yes, line LineH is moved into the horizontal line class classHori.

2) Grouping of Vertical Lines

Check whether X coordinates of two end points of a line LineV in m_arrGraphBlock are the same. If yes, line LineV is moved into the vertical line class classVert.

In some embodiments, in order to avoid extracting one straight line multiple times, after grouping the extracted lines into the groups of horizontal and vertical lines, some lines are combined.

Specifically, in some embodiments, if the Y coordinates of endpoints of any two horizontal lines are the same, it is determined whether the two horizontal lines include at least one point having the same coordinates. If yes, the two horizontal lines are combined into one horizontal line.

For example, consider two horizontal lines LineH1 and LineH2. The coordinates of the left endpoint and the right endpoints of LineH1 are (Lhx1, hy1) and (Rhx1, hy1), respectively. Moreover, the coordinates of the left endpoint and the right endpoints of LineH2 are (Lhx2, hy2) and (Rhx2, hy2), respectively. If hy1 of LineH1 is equal to hy2 of LineH2, then it is determined whether there is an intersection between the two horizontal lines LineH1 and LineH2, i.e., whether Lhx2 or Rhx2 is located between Lhx1 and Rhx1. If yes, LineH1 and LineH2 are combined into one horizontal line.

In some embodiments, if LineH1 and LineH2 are connected to each other, they are combined into a line LineHm. The coordinates of left and right endpoints of LineHm could be determined according to the coordinates of the left and right endpoints of LineH1 and LineH2. For example, assuming the X coordinate of a point increases when the point move from left to right, the X coordinate of the left endpoint of LineHm equals to the smaller one of the X coordinate of the left endpoint of LineH1 and the X coordinate of the left endpoint of LineH2. Similarly, the X coordinate of the right endpoint of LineHm equals to the larger one of the X coordinate of the right endpoint of LineH1 and the X coordinate of the right endpoint of LineH2. Further, the Y coordinates of both endpoints of LineHm equal hy1 (i.e., hy2, since hy1 and hy2 equal to each other).

Similar to the horizontal lines, in some embodiments, if the X coordinates of endpoints of any two vertical lines are the same, it is determined whether the two vertical lines include at least one point having the same coordinates. If yes, the two vertical lines are combined into one vertical line.

For example, consider two vertical lines LineV1 and LineV2. The coordinates of the upper endpoint and the lower endpoints of LineV1 are (vx1, Uvy1) and (vx1, Lvy1), respectively. Moreover, the coordinates of the upper endpoint and the lower endpoints of LineV2 are (vx2, Uvy2) and (vx2, Lvy2), respectively. If vx1 of LineV1 is equal to vx2 of LineV2, then it is determined whether there is an intersection between the two vertical lines LineV1 and LineV2, i.e., whether Uvy2 or Lvy2 is located between Uvy1 and Lvy1. If yes, LineV1 and LineV2 are combined into one vertical line.

In some embodiments, if LineV1 and LineV2 are connected to each other, they are combined into a line LineVm. The coordinates of upper and lower endpoints of LineVm could be determined according to the coordinates of the upper and lower endpoints of LineV1 and LineV2. For example, assuming the Y coordinate of a point increases when the point move from up to down, the Y coordinate of the upper endpoint of LineVm equals to the smaller one of the Y coordinate of the upper endpoint of LineV1 and the Y coordinate of the upper endpoint of LineV2. Similarly, the Y coordinate of the lower endpoint of LineVm equals to the larger one of the Y coordinate of the lower endpoint of LineV1 and the Y coordinate of the lower endpoint of LineV2. Further, the X coordinate of both endpoints of LineVm equals vx1 (i.e., vx2, since vx1 and vx2 equal to each other).

Sometimes, the thickness of lines and identification errors may cause a line to be recognized as two very close lines. To avoid such a situation, in some embodiments, it is further determined whether spaces between lines are relatively small. If yes, only one line is kept and other lines are removed.

Specifically, for a horizontal line class classHori, it is determined whether a space between a line LineH and any other line LineHy in classHori is relatively small, that is, whether an absolute value of a difference between the Y coordinate of one endpoint (such as the left endpoint) of LineH and the Y coordinate of a corresponding endpoint (such as the left endpoint) of LineHy is smaller than a threshold value, such as, for example, 2.5. If yes, one of LineH and LineHy (for example, LineH) is kept and the other one (for example, LineHy) is removed.

Similarly, for a vertical line class classVert, it is determined whether a space between a line Line V and any other line LineVx in classVert is relatively small, that is, whether an absolute value of a difference between the X coordinate of one endpoint (such as the upper endpoint) of Line V and the X coordinate of a corresponding endpoint (such as the upper endpoint) of LineVx is smaller than a threshold value, such as, for example, 2.5. If yes, one of Line V and LineVx (for example, LineV) is kept and the other one (for example, LineVx) is removed.

In some embodiments, in order to prevent frame lines of the layout from affecting the results, extracted lines that are outside the layout are filtered outlines. Specifically, a line having both endpoints located in the area of the layout is kept, and a line having at least one endpoint located outside the layout is removed.

Referring to FIG. 3, at 302, it is determined whether a horizontal line in the horizontal line class intersects with a vertical lines in the vertical line class. If yes, the horizontal line and the vertical line that intersect with each other are grouped as an intersected line group. In some embodiments, information of the intersected line group may be stored in a preset table to form a table class.

Specifically, 302 further includes:

(a) Extract a horizontal line LineH from the horizontal line class classHori, and check whether there is a vertical line LineV in the vertical line class classVert that intersects with LineH. If yes, perform (b); otherwise, repeat (a).

(b) Move LineH into a horizontal line set arrHori in the table class Table and move LineV into a vertical line set arrVert in the table class Table.

(c) Check whether there is a line in classHori or classVert that intersects with a line in Table. If yes, move the line into the horizontal line set arrHori in table class Table (if the line is a horizontal line) or move the line into the vertical line set arrVert in the table class Table (if the line is a vertical line).

(d) Add table class Table into a table class set arrTable.

(e) Repeat (a) until there is no line in classHori that intersects with any line in classVert.

Referring to FIG. 3, at 303, it is determined whether the number of intersected lines in an intersected line group is larger than a first threshold. f yes, a first area in which the straight lines in the table class are located is determined to be a table area (305 in FIG. 3). Otherwise, the process 300 proceeds to 304.

In some embodiments, an intersected line group comprises two lines having at least one intersection. When determining whether the number of intersected lines in an intersected line group is larger than the first threshold, it needs to be decided how many intersected lines would form a table. Generally, five lines intersecting with each other may be needed to form an ordinary table. Therefore, in some embodiments, the first threshold may be 5. However, during actual use, the value of the first threshold may be varied in accordance with actual conditions for forming a table.

At 304, characters in the first area are extracted and vertical projection is performed on the extracted characters. Results of the vertical projection are used to determine whether the first area is a table area.

Consistent with embodiments of the present disclosure, at 303, if the number of horizontal lines and the number of vertical lines in the table class are both larger than 2, the area in which these lines are located may be tentatively determined to be a table area. To further exclude the misleading effect of frame lines, text contents between two lines are used to assist the determination of whether the intersected lines form a table. The specific determining approaches comprise the following two approaches, and in a specific application, it may be implemented by one of the two approaches or a combination of the two approaches.

Approach 1: determining whether there are one or more characters between two horizontal lines in the table class. If yes, it is checked whether the one or more characters between the horizontal lines are located between two vertical lines, and whether the number of the characters is smaller than a second threshold. If yes to both, then the area in which the lines in the table set are located is determined to be a table area.

In some embodiments, because the second threshold may be determined according to the maximum number of characters that could be arranged in a row, which in turn may depend on sizes of the layout and the characters. In some embodiments, the second threshold may be set to 25.

Approach 2: determining an arrangement of a character using a projection of the character, including extracting characters in the area in which the lines of a table class is located and obtaining a distance between any two characters; determining whether the two characters are neighboring characters based on a distance between the two characters, and if yes, combining the neighboring characters to form a text block; performing vertical projection on the combined text block and determining an interval range of each text block in the column direction; and determining the number of rows in each column based on the determined interval range. If the number of projecting columns is larger than or equal to 2, the area in which the lines of the table class are located is determined to be a table area.

In some embodiments, after an area is determined to be a table area using the vertical projecting method, a format of the entire table may be determined as follows.

Count the number of rows in each column to find out the maximum number of rows maxLine. If maxLine is larger than 15, a maximum space maxSpace is set to be C1 times an average font size of the text blocks. Otherwise, if maxLine is larger than 8, maxSpace is set to be the average font size of the text blocks. Otherwise, maxSpace is set to be C2 times the average font size of the text blocks. Then, adjacent columns having an interval space that is too small are filtered out. For example, if the interval space between two adjacent columns is less than maxSpace minus 1 and there is no vertical line between the two adjacent columns (i.e., no line in the vertical line class classVert is located between the two projected columns), the two columns are filtered out.

In some embodiments, the threshold C1 may be set to 0.6 and the threshold C2 may be set to 1.3.

Additionally, in some embodiments, the determining whether two characters are neighboring characters based on the distance includes the following.

Acquiring two characters T1 and T2 that are to be determined. The font sizes of T1 and T2 are f1 and f2, respectively. The coordinates of upper left corners of T1 and T2 are (x1, y1) and (x2, y2), respectively, and the coordinates of lower right corners of T1 and T2 are (x1', y1') and (x2', y2'), respectively.

Determining whether c<cmax, dx<dxmax, and dy<dymax are satisfied. If yes, the two characters are determined to be neighboring characters. In the above expressions, c is a font size difference coefficient and is equal to $2*(f1-f2)/(f1+f2)$; dx is a horizontal distance coefficient between T1 and T2, and is equal to $(max(x1, x2)-min(x1', x2'))/h$; dy is a vertical distance coefficient between T1 and T2, and is equal to $(max(y1, y2)-min(y1', y2'))/h$; h is an average character height and is equal to $(y1'-y1+y2'-y2)/2$; cmax is a font size difference coefficient threshold; dxmax is a horizontal distance coefficient threshold; and dymax is a vertical distance coefficient threshold.

Consistent with embodiments of the present disclosure, after determining the area in which the lines included in the table class is a table area, border lines of the table may be determined based on coordinates of the lines. Specifically, an upper boundary of the table area corresponds to the minimum value of the Y coordinates of endpoints of all lines in the horizontal line set arrHori in Table, and a lower boundary of the table area corresponds to the maximum value of the Y coordinates of endpoints of all lines in the horizontal line set arrHori in Table. Further, a left boundary of the table area corresponds to the minimum value of the X coordinates of endpoints of all lines in the vertical line set arrVert in Table, and a right boundary of the table area corresponds to the maximum value of the X coordinates of endpoints of all lines in the vertical line set arrVert in Table.

According to embodiments of the present disclosure, an area can be determined as a table area more accurately by analyzing the table lines and the characters in the table simultaneously. According to method consistent with embodiments of the present disclosure, a table can be quickly positioned and can be identified automatically, and thus the indexing efficiency can be improved and the cost of data processing can be reduced.

Embodiments of the present disclosure may be implemented using certain hardware, software, or a combination thereof. In addition, embodiments of the present disclosure may be adapted to a computer program product embodied on one or more computer readable storage media (comprising but not limited to disk storage, CD-ROM, optical memory and the like) containing computer program codes.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for identifying a table in a digital file, comprising:
   extracting lines from a layout of the digital file, the lines comprising horizontal lines and vertical lines;
   identifying intersected line groups, each intersected line group comprising a horizontal line of the extracted horizontal lines and a vertical line of the extracted vertical lines, the horizontal line and the vertical line intersecting with each other; and
   determining whether the number of intersected lines in each intersected line group is larger than a first threshold, and
   if it is determined that the number of intersected lines in each intersected line group is larger than the first threshold, identifying an area in which the intersected line groups are located as a table area;
   if it is determined that the number of intersected lines in each intersected line group is not larger than the first threshold:
   performing vertical projection on characters in the area; and
   identifying the area as a table area based on a result of the vertical projection, wherein performing vertical projection on the characters comprises:
   obtaining a distance between any two characters in the area;

identifying neighboring characters based on the distance;
combining the neighboring characters to form a text block; and
performing vertical projection on the combined text block;
and wherein identifying the area as the table area based on the result of the vertical projection comprises:
determining an interval range of each projected text block in a column direction;
determining the number of rows in each column based on the determined interval range; and
determining whether the number of rows is larger than or equal to 2, and
if it is determined that the number of rows is larger than or equal to 2, determining the area to be a table area.

2. The method according to claim 1, wherein identifying intersected line groups further comprises:
grouping the extracted lines into a group of horizontal lines and a group of vertical lines;
checking, for a horizontal line, whether there is a vertical line that intersects with the horizontal line; and
identifying the horizontal line and the vertical line that intersect with each other as an intersected line group.

3. The method according to claim 1, wherein obtaining a distance between any two characters comprises:
determining whether c<cmax, dx<dxmax and dy<dymax are satisfied, and
if it is determined that c<cmax, dx<dxmax and dy<dymax are satisfied, determining the two characters are neighboring texts,
where,
cmax is a font size difference coefficient threshold,
dxmax is a horizontal distance coefficient threshold,
dymax is a vertical distance coefficient threshold,
c is a font size difference coefficient and is equal to $2*(f1-f2)/(f1+f2)$;
f1 is a font size of one character T1 of the two characters,
f2 is a font size of one character T2 of the two characters,
dx is a horizontal distance coefficient between T1 and T2, and is equal to $(max(x1, x2)-min(x1', x2'))/h$,
dy is a vertical distance coefficient between T1 and T2, and is equal to $(max(y1, y2)-min(y1', y2'))/h$,
(x1, y1) and (x2, y2) are coordinates of an upper left corner of T1 and an upper left corner of T2, respectively,
(x1', y1') and (x2', y2') are coordinates of a lower right corner of T1 and a lower right corner of T2, respectively, and
h is an average character height and is equal to $(y1'-y1+y2'-y2)/2$.

4. The method according to claim 1, further comprising:
determining whether two horizontal lines having a same Y coordinate include at least one point having same coordinates, and
if it is determined that two horizontal lines having the same Y coordinate include at least one point having same coordinates, combining the two horizontal lines; and
determining whether two vertical lines having a same X coordinate include at least one point having same coordinates, and
if it is determined that two vertical lines having the same X coordinate include at least one point having same coordinates, combining the two vertical lines.

5. An apparatus for identifying a table in a digital file, comprising:
a line extracting component that extracts lines from a layout of the digital file;
a projecting component that performs vertical projection on characters; and a table identifying component that: identifies intersected line groups, each intersected line group comprising a horizontal line of the extracted horizontal lines and a vertical line of the extracted vertical lines, the horizontal line and the vertical line intersecting with each other; and
determines whether the number of intersected lines in each intersected line group is larger than a first threshold, and
if it is determined that the number of intersected lines in each intersected line group is larger than the first threshold, identifies an area in which the determined intersected line groups are located as a table area;
if it is determined that the number of intersected lines in each intersected line group is not larger than the first threshold, identifies the area as a table area based on a result of a vertical projection performed on characters in the area, wherein the projecting component is further configured to:
obtain a distance between any two characters in the area;
identify neighboring characters based on the distance;
combine the neighboring characters to form a text block; and
perform vertical projection on the combined text block,
and wherein the table identifying component is further configured to:
determine an interval range of each projected text block in a column direction;
determine the number of rows in each column based on the determined interval range; and
determine the area is a table areas if the determined number is larger than or equal to 2.

6. The apparatus according to claim 5, further comprising:
a table line detecting component configured to:
group the extracted lines into a group of horizontal lines and a group of vertical lines,
check, for a horizontal line, whether there is a vertical line that intersects with the horizontal line, and
identify the horizontal line and the vertical line that intersect with each other as an intersected line group.

7. The apparatus according to claim 5, further comprising:
a character determination component configured to:
identify characters located between two horizontal lines belonging to the intersected line groups and between the two vertical lines belonging to the intersected line groups, and
determine whether the number of the identified characters is smaller than a second threshold.

8. The apparatus according to claim 5, further comprising:
a line combining component configured to:
determine whether two horizontal lines having a same Y coordinate include at least one point having same coordinates, and
combine the two horizontal lines to one horizontal line.

9. The apparatus according to claim 8, wherein the line combining component is further configured to:
determine whether two vertical lines having a same X coordinate include at least one point having same coordinates; and
combine the two vertical lines to one vertical line.

10. A method for identifying a table in a digital file, comprising:
extracting lines from a layout of the digital file, the lines comprising horizontal lines and vertical lines;
identifying intersected lines, each intersected line intersecting with another line;
performing vertical projection on characters in an area in which the intersected lines are located;

detecting projected characters that are located between horizontal lines and vertical lines of the intersected lines; and determining whether the number of the characters located between horizontal lines and vertical lines of the intersected lines is smaller than a preset threshold, and if yes, identifying the area as a table area, wherein performing vertical projection on the characters comprises:

obtaining a distance between any two characters in the area;

identifying neighboring characters based on the distance;

combining the neighboring characters to form a text block; and performing vertical projection on the combined text block; and wherein identifying the area as the table area comprises:

determining an interval range of each projected text block in a column direction;

determining the number of rows in each column based on the determined interval range; and determining whether the number of rows is larger than or equal to 2, and if it is determined that the number of rows is larger than or equal to 2, determining the area to be a table area.

* * * * *